No. 868,892. PATENTED OCT. 22, 1907.
W. E. SANDFORD.
SKELP CHARGER.
APPLICATION FILED AUG. 20, 1906.
2 SHEETS—SHEET 1.
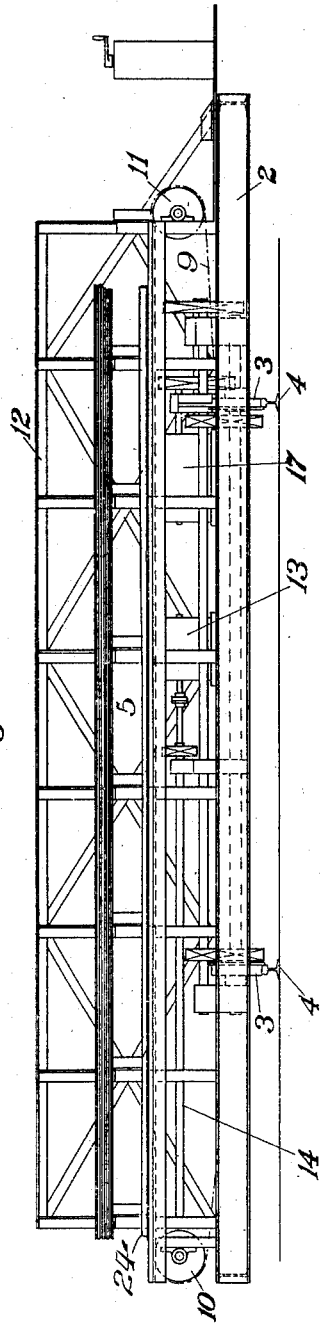
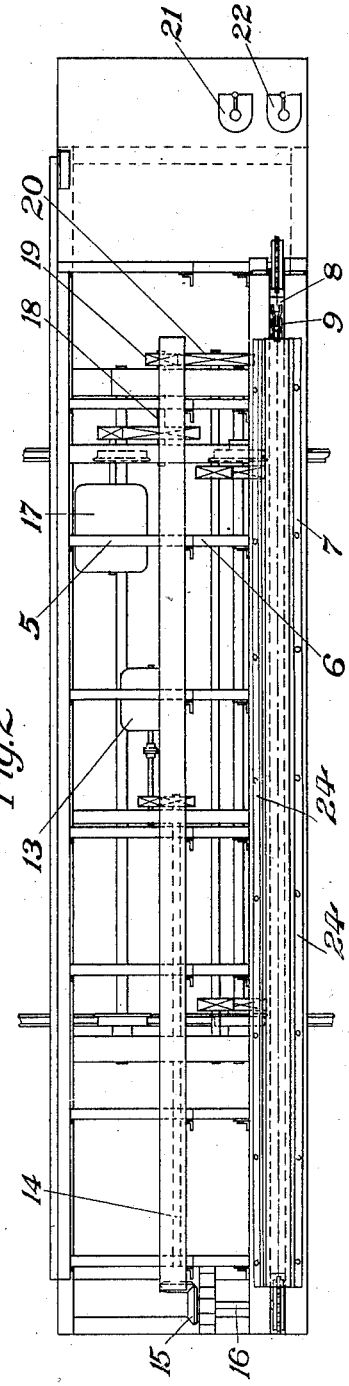
WITNESSES
INVENTOR
William E. Sandford No. 868,892. PATENTED OCT. 22, 1907.
W. E. SANDFORD.
SKELP CHARGER.
APPLICATION FILED AUG. 20, 1906.

WITNESSES
Frank W. Gordon
Arthur R. Dunn

INVENTOR
William E. Sandford

UNITED STATES PATENT OFFICE.

WILLIAM E. SANDFORD, OF ZANESVILLE, OHIO.

SKELP-CHARGER.

No. 868,892.  Specification of Letters Patent.  Patented Oct. 22, 1907.

Application filed August 20, 1906. Serial No. 331,223.

*To all whom it may concern:*

Be it known that I, WILLIAM E. SANDFORD, of Zanesville, Muskingum county, Ohio, have invented a new and useful Skelp-Charger, of which the following is a full, clear, and exact description, reference being had to the accompanying drawings, forming part of this specification, in which—

Figure 3:
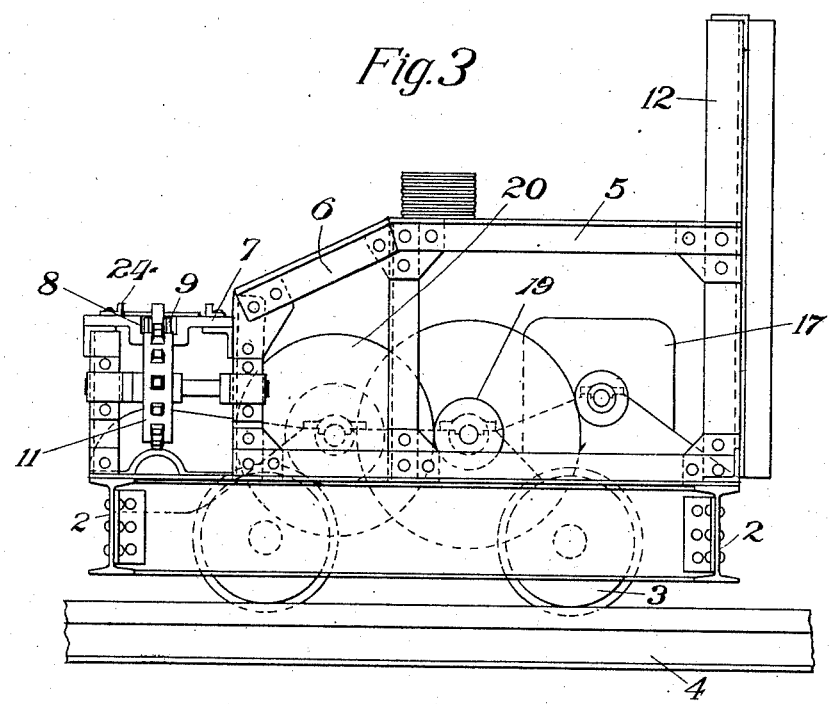
Figure 4:
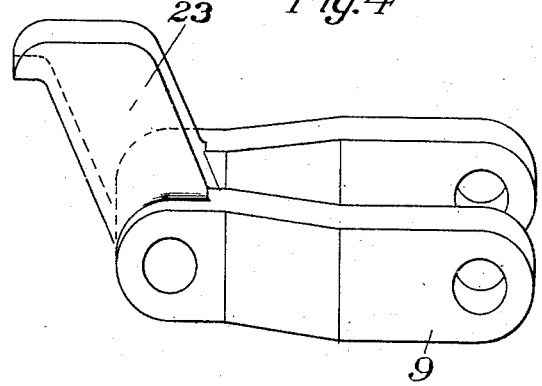

Figure 1 is a side elevation of my improved apparatus; Fig. 2 is a top plan view; Fig. 3 is an end elevation with controllers removed; and Fig. 4 is a detail of the pusher hook.

My invention relates to apparatus for charging skelp into welding furnaces, and is designed to provide a traveling frame-work or support which will carry a pile of the skelp to be fed into the furnace.

It is also designed to provide for feeding the skelp in at various points along the furnace hearth, and to avoid the use of hand labor in feeding.

In the drawings, 2 represents a car or truck structure carried upon wheels 3, 3 movable on track rails 4. These track rails extend parallel with the rear face of the furnace, so that the platform moves back and forth along the furnace. On this frame is mounted a framework having a skelp-receiving platform or raised support 5 connecting by inclined skid-ways 6 with a table 7. This table is preferably formed of castings with registering longitudinal grooves forming a guide-way 8 for roller chain 9. This roller chain is carried upon end sprocket wheels 10 and 11 beyond the ends of the support 7 and driven by any proper connections.

At the side of the platform or support 5 I have shown a frame-work 12 which is arranged to hold the skelp in place and prevent its falling off the truck or traveling charger.

For the purpose of driving the chain I have shown the motor 13 having slow motion gearing connecting it with shaft 14 which connects by bevel gearing 15 with one of the shafts 16 of the sprocket wheels. I have also shown the motor 17 as connected through intermediate gearing with a shaft 18 having pinion 19 engaging toothed wheel 20 on a shaft geared to the axle of one pair of wheels. The controllers 21 and 22 may be placed on an extension of the truck and the operator may control both the position of the charger, and also the operation of the pushing chain. This chain is provided at suitable intervals with the teeth or pusher hooks 23 which will strike the rear face of the skelp and act to positively push it through the guide-trough formed by the angle pieces 24 secured to the table on either side of the chain guide-way 8, and into the furnace hearth.

In the use of the apparatus, the skelp is piled upon the elevated support and the operator slides one piece down the skid-ways 6, into the guide trough. Then, having brought the whole charger to the desired position with reference to the furnace slot or opening, he starts the chain into motion, and thus positively forces the skelp forwardly into place on the furnace hearth. He may then stop the chain motor and move the charger to another position and slide another piece of skelp down into the guide-trough and so on. It will be understood that, as the inner end of the table 7 is very close to the furnace slot or opening, the piece of skelp being pushed through the guide-trough, will be mostly within the furnace hearth by the time the pusher hook 23 reaches the end of its travel, only a small portion projecting and resting upon the table. As the hook passes downward over the sprocket-wheel 10, it springs the end of the skelp which is still supported by the table so that, as the hook slips off, the skelp is shot forward with sufficient force to carry it entirely into the furnace hearth.

The advantages of my invention result from the mechanical charging of the skelp, the use of hand labor for pushing into the furnace being avoided. It also results from the carrying of the skelp to be charged upon the charger itself, thus giving a storage capacity. The apparatus is under complete control of the operator and the skelp may be readily and accurately charged.

Many variations may be made in the form and arrangement of the truck or platform, the storage support, and the pusher, without departing from my invention.

I claim:—

1. In a skelp charger, a movable truck or platform arranged to travel across the front of the furnace hearth, and having a support in which skelp may be piled and provided with a pusher arranged to move the skelp one by one over said platform and then place it under tension causing the skelp to pass beyond the pusher and into the furnace; substantially as described.

2. A skelp charger comprising a movable frame or frames having a guide trough for the skelp, a chain movable therein, and means for starting and stopping the chain, said chain being provided with a pusher to engage the skelp and move it through the trough and then place it under tension causing it to spring beyond the same into the furnace; substantially as described.

3. A skelp charger having a traveling platform provided with side guides for the skelp, a chain movable therein, and having a pusher arranged to force the skelp along the platform and then place it under tension, whereby as the pusher leaves the skelp the latter is forcibly thrown into the furnace.

4. A skelp charger having a storage support and inclines leading therefrom to the charging device proper, a guide trough for the skelp having therein a central guide-way, a chain movable therein, said chain carrying a pusher arranged to move the skelp through said trough and then place it under tension, whereby the skelp is forced into the furnace as the pusher leaves the same; substantially as described.

5. A skelp charger having a platform at one side, downwardly-inclined ways leading from said platform to a lower support or table having a guide-trough for the skelp, and a chain arranged to push the skelp along said lower support and to place the same under tension, whereby as the chain is disengaged the skelp is forced into the furnace; substantially as described.

6. A skelp charger having a suitable platform or support, and a reciprocable pusher arranged to force the skelp along the platform and then place it under tension causing the skelp to spring beyond the pusher as the latter is disengaged therefrom.

In testimony whereof, I have hereunto set my hand.

WILLIAM E. SANDFORD.

Witnesses:
FRANK W. GORDON,
ARTHUR R. DUNN.